(12) United States Patent
Tetreault et al.

(10) Patent No.: US 11,669,698 B2
(45) Date of Patent: Jun. 6, 2023

(54) METHOD AND SYSTEM FOR AUTOMATIC FORMALITY CLASSIFICATION

(71) Applicant: YAHOO ASSETS LLC, Dulles, VA (US)

(72) Inventors: Joel Tetreault, New York, NY (US); Ellie Pavlick, New York, NY (US)

(73) Assignee: YAHOO ASSETS LLC, New York, NY (US)

( * ) Notice: Subject to any disclaimer, the term of this patent is extended or adjusted under 35 U.S.C. 154(b) by 168 days.

(21) Appl. No.: 16/929,203

(22) Filed: Jul. 15, 2020

(65) Prior Publication Data

US 2020/0342181 A1 Oct. 29, 2020

Related U.S. Application Data

(62) Division of application No. 14/757,446, filed on Dec. 23, 2015, now Pat. No. 10,740,573.

(51) Int. Cl.
| | |
|---|---|
| *G06F 40/10* | (2020.01) |
| *G06F 40/205* | (2020.01) |
| *G06F 40/56* | (2020.01) |
| *G06F 16/335* | (2019.01) |
| *G06F 16/34* | (2019.01) |
| *G06F 40/35* | (2020.01) |
| *G06F 40/253* | (2020.01) |

(52) U.S. Cl.
CPC ............ *G06F 40/56* (2020.01); *G06F 16/335* (2019.01); *G06F 16/345* (2019.01); *G06F 40/253* (2020.01); *G06F 40/35* (2020.01)

(58) Field of Classification Search
CPC .............. G06F 17/2785; G06F 17/274; G06F 16/3344; G06F 17/2705; G06F 17/273; G06F 40/10; G06F 40/205
See application file for complete search history.

(56) References Cited

U.S. PATENT DOCUMENTS

| | | |
|---|---|---|
| 5,978,820 A | 11/1999 | Mase et al. |
| 7,802,184 B1 | 9/2010 | Battilana |
| 8,396,035 B2 | 3/2013 | van Rensburg et al. |
| 8,903,719 B1 | 12/2014 | Landry et al. |
| 9,244,894 B1 | 1/2016 | Dale et al. |

(Continued)

OTHER PUBLICATIONS

Sheikha et al, "Automatic classification of documents by formality.", 2010, Proceedings of the 6th International Conference on Natural Language Processing and Knowledge Engineering (NLPKE-2010). IEEE, 2010. pp 1-5.

(Continued)

*Primary Examiner* — Olujimi A Adesanya
(74) *Attorney, Agent, or Firm* — Venable LLP

(57) ABSTRACT

The present teaching relates to automatic formality classification and transformation of online text items. In one example, a request is received for determining a formality level of a text item in an online communication. One or more linguistic features are extracted from the text item. Contextual information with respect to the online communication is extracted. A formality level of the text item is determined based on the one or more linguistic features and the contextual information. The formality level represents a degree of formality of the text item. The formality level is provided as a response to the request.

18 Claims, 14 Drawing Sheets

(56) References Cited

U.S. PATENT DOCUMENTS

| | | | |
|---|---|---|---|
| 9,465,793 B2* | 10/2016 | Hoover | G06F 40/205 |
| 9,535,892 B1* | 1/2017 | Matthews | G06F 16/951 |
| 2004/0205674 A1 | 10/2004 | Delgado et al. | |
| 2004/0225640 A1 | 11/2004 | Brown et al. | |
| 2005/0075880 A1 | 4/2005 | Pickover et al. | |
| 2005/0288920 A1 | 12/2005 | Green et al. | |
| 2006/0167675 A1 | 7/2006 | Miyahira et al. | |
| 2006/0256937 A1 | 11/2006 | Foreman et al. | |
| 2006/0277029 A1 | 12/2006 | Green et al. | |
| 2007/0073517 A1 | 3/2007 | Panje | |
| 2008/0021875 A1* | 1/2008 | Henderson | G06F 16/3344 |
| 2008/0126481 A1 | 5/2008 | Chakra et al. | |
| 2009/0198488 A1* | 8/2009 | Vigen | G06F 40/30 |
| | | | 704/9 |
| 2009/0210803 A1 | 8/2009 | Brignull et al. | |
| 2009/0228583 A1 | 9/2009 | Pocklington et al. | |
| 2009/0276500 A1 | 11/2009 | Karmarkar | |
| 2009/0319915 A1 | 12/2009 | Bates et al. | |
| 2010/0063871 A1 | 3/2010 | Merrifield, Jr. et al. | |
| 2011/0060761 A1* | 3/2011 | Fouts | G06F 40/10 |
| | | | 707/E17.071 |
| 2011/0225049 A1* | 9/2011 | Bhatia | G06Q 30/0269 |
| | | | 705/14.66 |
| 2012/0203545 A1 | 8/2012 | Shaw | |
| 2012/0265528 A1 | 10/2012 | Gruber et al. | |
| 2012/0290299 A1 | 11/2012 | Basson et al. | |
| 2012/0297294 A1* | 11/2012 | Scott | G06F 40/253 |
| | | | 715/264 |
| 2012/0330667 A1 | 12/2012 | Sun et al. | |
| 2013/0173247 A1 | 7/2013 | Hodson | |
| 2013/0185049 A1 | 7/2013 | Zhao et al. | |
| 2013/0211825 A1 | 8/2013 | Tseng et al. | |
| 2013/0253910 A1* | 9/2013 | Turner | G06F 40/253 |
| | | | 704/9 |
| 2013/0282365 A1 | 10/2013 | Van De Ven et al. | |
| 2013/0297581 A1* | 11/2013 | Ghosh | G06F 16/951 |
| | | | 707/706 |
| 2014/0059031 A1 | 2/2014 | Green et al. | |
| 2014/0067458 A1 | 3/2014 | Akkiraju et al. | |
| 2014/0074945 A1* | 3/2014 | Kanevsky | G06Q 10/107 |
| | | | 709/206 |
| 2014/0094156 A1* | 4/2014 | Uusitalo | H04W 4/20 |
| | | | 455/418 |
| 2014/0337005 A1 | 11/2014 | Abdel-Hady et al. | |
| 2015/0032712 A1 | 1/2015 | Green et al. | |
| 2015/0052098 A1 | 2/2015 | KVeton et al. | |
| 2015/0120379 A1 | 4/2015 | Lee et al. | |
| 2015/0154278 A1* | 6/2015 | Allen | G06F 16/2457 |
| | | | 707/737 |
| 2015/0227973 A1* | 8/2015 | Wirtz | G06Q 30/0273 |
| | | | 705/14.57 |
| 2015/0286629 A1 | 10/2015 | Abdel-Reheem et al. | |
| 2016/0103824 A1 | 4/2016 | Zupancic | |
| 2016/0162464 A1 | 6/2016 | Munro et al. | |
| 2016/0182410 A1 | 6/2016 | Janakiraman et al. | |
| 2018/0107655 A1 | 4/2018 | Premkumar et al. | |
| 2018/0107685 A1 | 4/2018 | Kale et al. | |
| 2018/0108066 A1 | 4/2018 | Kale et al. | |
| 2018/0137551 A1 | 5/2018 | Zheng et al. | |
| 2019/0018893 A1 | 1/2019 | Weiss et al. | |

OTHER PUBLICATIONS

Peterson et al., "Email Formality in the Workplace: A Case Study on the Enron Corpus", 2011, Proceedings of the Workshop on Language in Social Media (LSM 2011 ), pp. 86-95, Portland, Oregon, Jun. 23, 2011.
Notice of Allowance dated Feb. 21, 2019 in U.S. Appl. No. 14/757,423.
Office Action dated Aug. 28, 2018 in U.S. Appl. No. 14/757,423.
International Preliminary Report on Patentability dated Jun. 26, 2018 in International Application PCT/US2016/065509.
International Search Report and Written Opinion dated Feb. 17, 2017 in International Application No. PCT/US2016/065574.
Office Action dated Feb. 4, 2019 in U.S. Appl. No. 14/757,446.
Office Action dated Jul. 31, 2018 in U.S. Appl. No. 14/757,446.
International Search Report and Written Opinion dated Feb. 17, 2017 in International Application No. PCT/US2016/065509.

* cited by examiner

410

I think the heat agitates people ...
do you think the jury will buy that ?
Oh , I know . —420
Were you doing 100 MPH ?
spoiler man ... we are still broadcasting
that season !!!

415

I believe that the heat agitates people .
Do you think the jury will believe that ?
Yes , I am aware . —425
Where you moving at 100 MPH or more ?
That season of the television show is still
being broadcast, so be careful not to reveal
spoilers .

FIG. 4

METHOD AND SYSTEM FOR AUTOMATIC FORMALITY CLASSIFICATION

CROSS-REFERENCE TO RELATED APPLICATION

The present application is a divisional of U.S. patent application Ser. No. 14/757,446, filed Dec. 23, 2015, which is related to U.S. patent application Ser. No. 14/757,423, now U.S. Pat. No. 10,346,546, which are incorporated herein by reference in their entireties.

BACKGROUND

Technical Field

The present teaching relates to methods, systems, and programming for Internet services. Particularly, the present teaching is directed to methods, systems, and programming for automatic formality classification and transformation of online text items.

Discussion of Technical Background

Two sentences may communicate a same idea, but with different degrees of formality. Formality differences or stylistic differences often have a larger impact on how the hearer understands a sentence than does the literal meaning. Formality has long been of interest to linguists and sociolinguists. However, existing techniques relied on hand-written rules to determine a formality level of a text item, which often does not give an accurate determination. Existing machine learning models for determining a formality is based on a simple binary classification model. In addition, existing works do not tell a user how to change a formality level of a text item, when the user is not satisfied with a formality of the text item.

Therefore, there is a need to provide an improved solution for formality classification and transformation to solve the above-mentioned problems.

SUMMARY

The present teaching relates to methods, systems, and programming for Internet services. Particularly, the present teaching is directed to methods, systems, and programming for automatic formality classification and transformation of online text items.

In one example, a method, implemented on a machine having at least one processor, storage, and a communication platform capable of connecting to a network for determining a formality level of a text item in an online communication is disclosed. A request is received for determining a formality level of a text item in an online communication. One or more linguistic features are extracted from the text item. Contextual information with respect to the online communication is extracted. A formality level of the text item is determined based on the one or more linguistic features and the contextual information. The formality level represents a degree of formality of the text item. The formality level is provided as a response to the request.

In another example, a method, implemented on a machine having at least one processor, storage, and a communication platform capable of connecting to a network for recommending a text item to an online user is disclosed. A request is received for recommending a text item to an online user. The request is associated with a plurality of text items. One or more linguistic features are extracted from each of the plurality of text items. Contextual information with respect to the online user is extracted. A formality level of each of the plurality of text items is determined based on the one or more linguistic features and the contextual information. The formality level represents a degree of formality of the text item. One or more text items are selected from the plurality of text items based on their respective formality levels. The one or more text items are recommended to the online user.

In a different example, a system having at least one processor, storage, and a communication platform capable of connecting to a network for determining a formality level of a text item in an online communication is disclosed. The system includes: a request analyzer configured for receiving a request for determining a formality level of a text item in an online communication; a linguistic feature extractor configured for extracting one or more linguistic features from the text item; a contextual information extractor configured for extracting contextual information with respect to the online communication; and a formality level determiner configured for determining a formality level of the text item based on the one or more linguistic features and the contextual information, and providing the formality level as a response to the request, wherein the formality level represents a degree of formality of the text item.

Other concepts relate to software for implementing the present teaching on automatic formality classification and transformation. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for determining a formality level of a text item in an online communication is disclosed. The information, when read by the machine, causes the machine to perform the following: receiving a request for determining a formality level of a text item in an online communication; extracting one or more linguistic features from the text item; extracting contextual information with respect to the online communication; determining a formality level of the text item based on the one or more linguistic features and the contextual information, wherein the formality level represents a degree of formality of the text item; and providing the formality level as a response to the request.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 4 illustrates exemplary sentences before and after a formality transformation, according to an embodiment of the present teaching;

DETAILED DESCRIPTION

Figure 1:
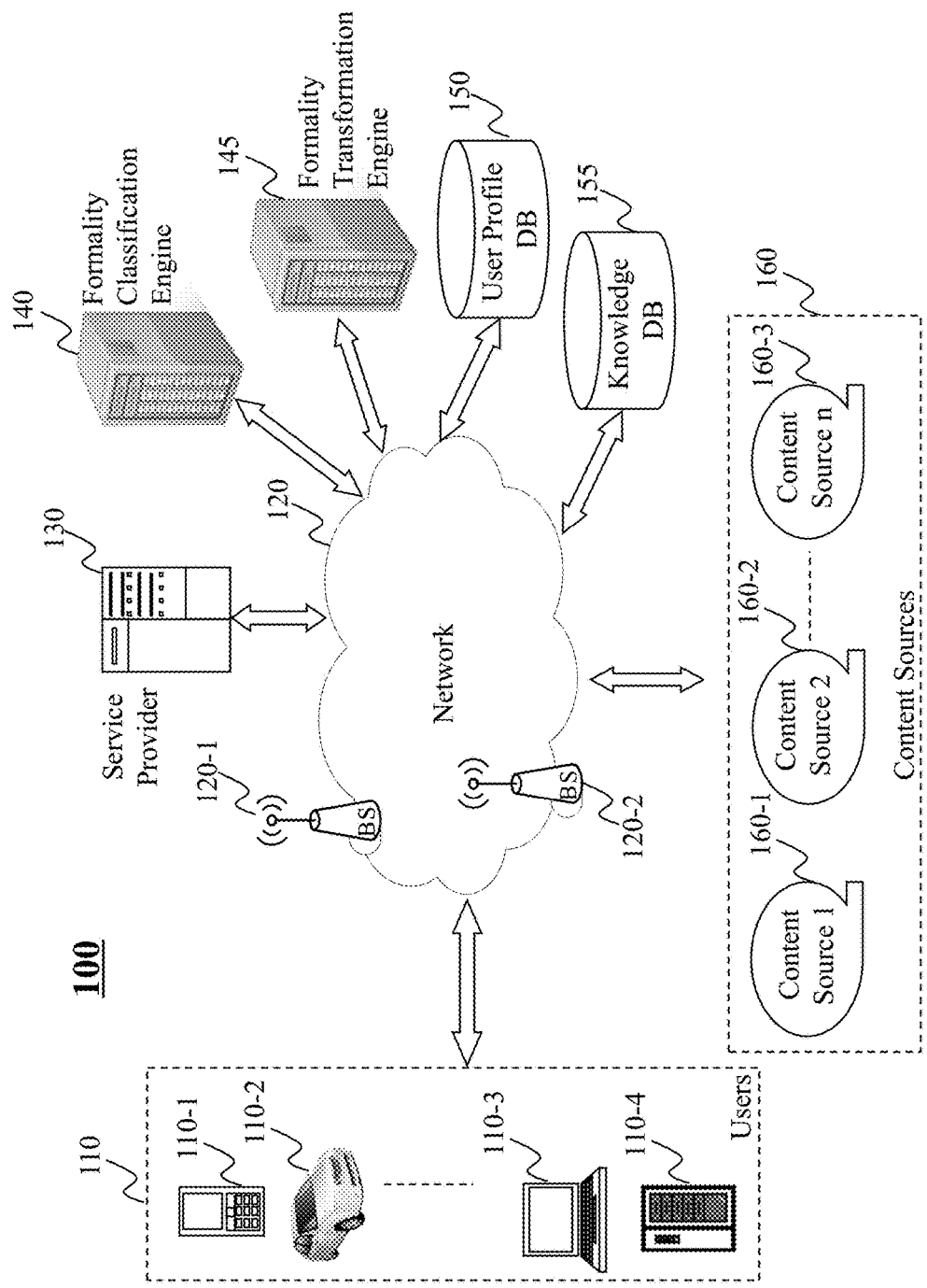
FIG. 1 is a high level depiction of an exemplary networked environment for automatic formality classification and transformation, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of efficiently and effectively determining and transforming formality of a text item. The method and system as disclosed herein may aim at improving users' satisfaction with a recommended online text item, especially in term of the formality of the text item.

An important aspect of natural language is the ability to express the same idea in different ways. In particular, the same content can be expressed in different styles: e.g. ideas can be stated formally or informally, subjectively or objectively, etc. For example, although the following two sentences communicate a same idea, the first sentence is substantially more formal than the second sentence. (1) Those recommendations were unsolicited and undesirable. (2) That is the stupidest suggestion EVER. Such stylistic differences often have a larger impact on how the hearer understands a sentence than does the literal meaning. Full natural language understanding requires comprehending this stylistic aspect of meaning. To enable real advancements in dialog systems, information extraction, and/or human-computer interaction, computers may need to understand the entirety of what humans say: both the literal and the non-literal. Natural language technologies which are capable of controlling the stylistic properties of their output are able to respond to individual users' styles and preferences and can interact more naturally with human users. This makes the ability to generate language with particular style properties an important component of natural language processing and human-computer interaction.

An automatic system is disclosed herein for rating the level of formality of a text item. There are countless venues for online communication, from email to social networks to discussion forums. The level of formality that can or should be used in each setting is an important part of natural language processing and understanding. The system can automatically predict the formality level of a piece of text. This ability may be applicable in many Internet services. For example, in email, addressing a prospective employer with "Hey!" can make the sender appear immature, incompetent, or rude. A formality classification engine as disclosed herein can be used to provide writing feedback to users to help them avoid composing inappropriate messages anywhere where users are able to compose text, e.g. email, tumblr, user comments. Models of formality can also contribute to search and ranking of text, for example to promote formally composed, information rich content above informal and subjective content, or to provide better personalization by recommending content to users based on the style of the content they tend to prefer.

In one embodiment, the formality classification is based on a statistical machine learning model trained with a suite of linguistic features to predict the formality of text, instead of hand-written rules or heuristic feature sets. In addition, the formality may be modeled on a continuum, i.e. the system can assign a real-valued formality level to a piece of text. A formality classification of a text item in an online communication may be based on contextual information with respect to the online communication, e.g. sender and receiver of the online communication, purpose of the online communication, role of the text item in the online communication, etc.

In addition, the present teaching discloses a novel system for translating between informal and formal language. This translation or transformation of formality of a text item does not change the literal meaning of the text item. The system can apply a deep learning architecture for paraphrasing informal English sentences in order to make them more formal. In one embodiment, the system uses a novel pre-training phase in which it trains on a large corpus of artificially generated training data to produce a naïve translation model. This model is then fine-tuned on a smaller, manually built training corpus to produce the final translation model. This final model can be used as a component of a natural language generation/dialogue system, or as a tool to automatically transform the formality of a user's writing to a target level, e.g. to help language learners compose more formal, professional emails, or to transform a news article to a formality level preferred by a user before recommending the news article to the user.

The terms "level of formality" and "formality level" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for automatic formality classification and transformation, according to an embodiment of the present teaching. In FIG. 1, the exemplary networked environment 100 includes one or more users 110, a network 120, a service provider 130, a formality classification engine 140, a formality transformation engine 145, a user profile database 150, a knowledge database 155, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the service provider 130, the formality classification engine 140, and the formality transformation engine 140, through wired or wireless technologies and related operating systems implemented within user-wearable devices (e.g., glasses, wrist watch, etc.).

The service provider 130 may correspond to an entity, an individual, a firm, or an organization, such as a television station, a newspaper issuer, an email server, a web page host, an online service provider, or a game server. The service provider 130 may be an organization such as USPTO.gov, a content provider such as CNN.com and Yahoo.com, or a content-feed source such as tweeter or blogs. In one embodiment, the service provider 130 includes entities that develop, support and/or provide online content via mobile applications (e.g., installed on smartphones, tablet devices, etc.).

A user, e.g., the user 110-1, may send an online communication, e.g. an email, a blog post, or an online comment, to the service provider 130 via the network 120. The user may also receive news articles, search results, or other online text items from the service provider 130. With respect to any of the above mentioned online text items, the formality classification engine 140 may determine a formality level of the text item, e.g. based on some linguistic features extracted from the text item and/or some contextual information, and provide a feedback to the user regarding the formality level of the text item. Based on the feedback, the user may consider increase or decrease the formality level of the text item accordingly. In one embodiment, after the formality classification engine 140 determines the formality level of the text item, the formality transformation engine 145 may automatically transform the formality level of the text item to a target level associated with the user, e.g. based on a preferred formality level stored in a user profile of the user.

The user profile database 150 may include user profiles of different users of the service provider 130. A user profile of a user may include information about the user's formality preferences, historical online behaviors, demographic information, user device information, etc. The formality classification engine 140 and the formality transformation engine 145 may utilize the user profile to perform automatic formality classification and transformation for a text item associated with the user.

The knowledge database 155 may include general knowledge information about natural language that can be utilized to generate training data for training models used by the formality classification engine 140 and the formality transformation engine 145.

The service provider 130, the formality classification engine 140, and the formality classification engine 145 may access information stored in the knowledge database 155 and the user profile database 150 via the network 120. The information in the knowledge database 155 and the user profile database 150 may be generated by one or more different applications (not shown), which may be running on the service provider 130, at the backend of the service provider 130, or as a completely standalone system capable of connecting to the network 120, accessing information from different sources, analyzing the information, generating structured information, and storing such generated information in the knowledge database 155 and the user profile database 150.

The formality classification engine 140 may determine a formality level of a text item associated with a user of the service provider 130. The text item may be at least part of an email written by the user, an online post written by the user, an online article to be recommended to the user, etc. The formality classification engine 140 may extract linguistic features from the text item. A linguistic feature may be a casing feature, a punctuation feature, numbers and types of entities, n-grams, constituency, dependency tuples, lexical feature, word length and frequency feature, readability feature, subjectivity feature, and average word embedding, etc. Based on the linguistic features and some contextual information about the text item, the formality classification engine 140 may determine a formality level of the text item using a machine learning model. The output of the machine learning model may be a real-valued formality level. The formality classification or determination may be in accordance with a granularity level, e.g. per word, per sentence, per paragraph, or per the whole text item.

After the formality classification engine 140 determines a formality level of the text item, the formality transformation engine 145 may transform the text item from a first formality level to a second formality level, without changing the literal meaning of the text item, e.g. by changing "Morning" to "Good morning." The transformation may increase or decrease the formality level of the text item, based on a request or the user's formality preference stored in a user profile of the user. In one embodiment, based on the linguistic features and some contextual information about the text item, the formality transformation engine 145 may transform the formality level of the text item using a machine learning model that is trained with parallel data associated with a plurality of training text items. With respect to each of the plurality of text items, the parallel data may include different versions of the training text item such that the different versions of the training text item have a same literal meaning but different known formality levels. The formality transformation may be in accordance with a granularity level, e.g. per word, per sentence, per paragraph, or per the whole text item.

The service provider 130 may provide content obtained from the content sources 160 based on a request from a user. A content source may correspond to an entity where the content was originally generated and/or stored. The content sources 160 in the exemplary networked environment 100 include multiple content sources 160-1, 160-2 . . . 160-3.

Figure 2:
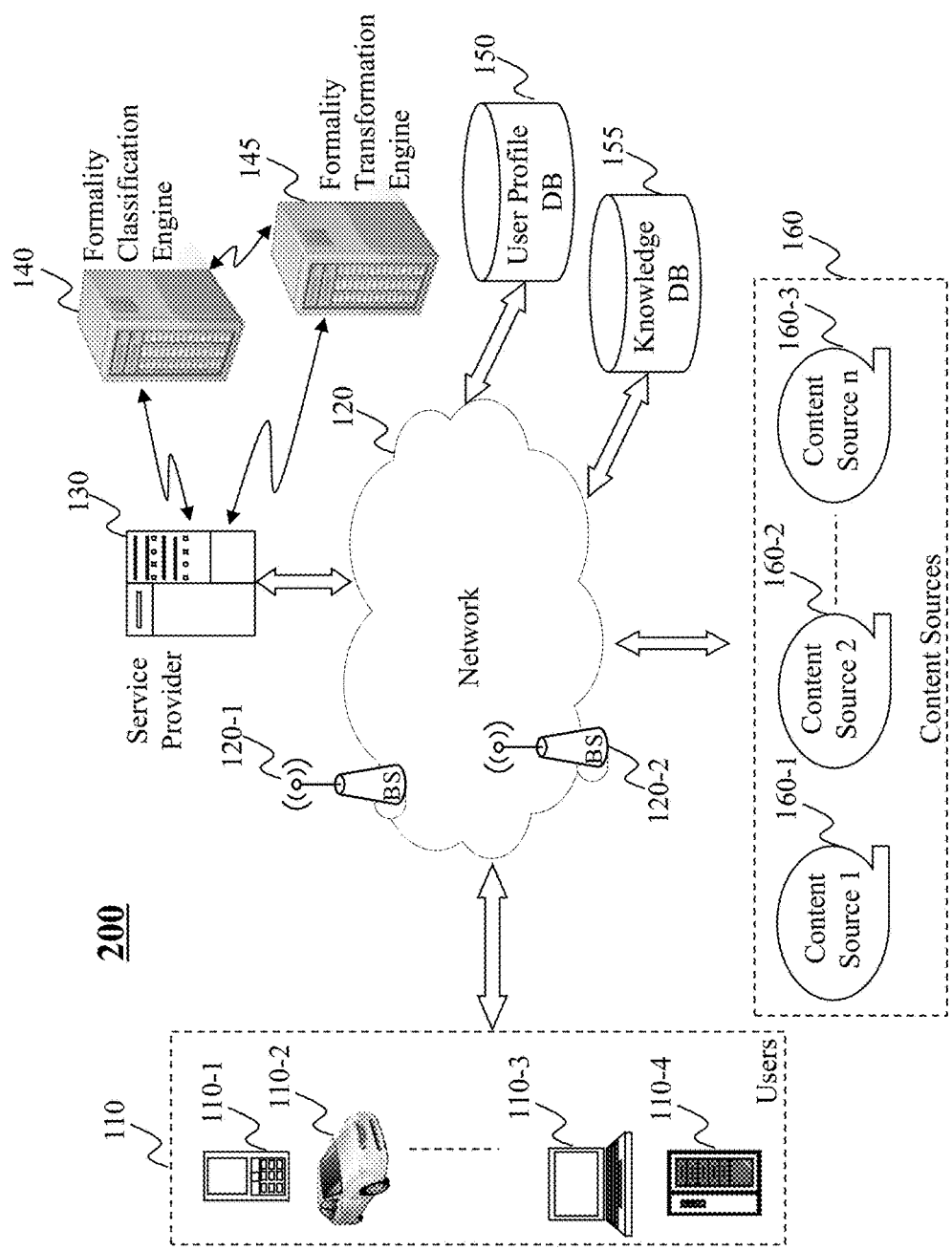
FIG. 2 is a high level depiction of another exemplary networked environment for automatic formality classification and transformation, according to an embodiment of the present teaching.

FIG. 2 is a high level depiction of another exemplary networked environment 200 for automatic formality classification and transformation, according to an embodiment of the present teaching. The exemplary networked environment 200 in this embodiment is similar to the exemplary networked environment 100 in FIG. 1, except that the formality classification engine 140 and the formality transformation engine 145 serve as backend systems for the service provider 130.

Figure 3:
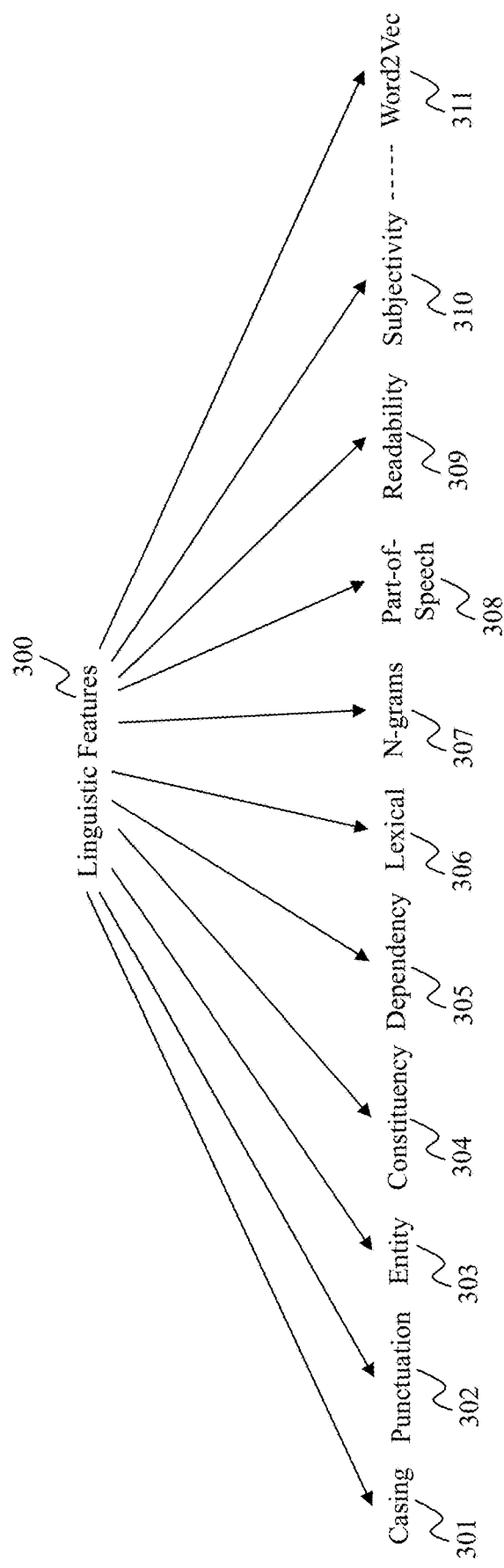
FIG. 3 illustrates exemplary linguistic features, according to an embodiment of the present teaching.

FIG. 3 illustrates exemplary linguistic features, according to an embodiment of the present teaching. As shown in FIG. 3, linguistic features of a text item, e.g. a sentence, may include casing feature 301, punctuation feature 302, entity feature 303, constituency 304, dependency 305, lexical feature 306, n-grams 307, part-of-speech 308, readability feature 309, subjectivity feature 310, and Word2Vec 311. A casing feature 301 may be related to: number of capitalized words, not including "I", in the sentence; binary indicator for whether the sentence is all lower case; and binary indicator for whether the first word is capitalized. A punctuation feature 302 may be related to numbers of "!", " . . . ", "?" in the sentence. An entity feature 303 may be related to numbers and types of entities. Constituency 304 may be related to: the depth of the constituency parse tree normalized by the length of the sentence; and the number of times each parse tree production rule occurs in the sentence, normalized by the length of the sentence. Dependency 305 may be related to dependency tuples in a dependency parse. A lexical feature 306 may be related to word length and frequency in the sentence. N-grams 307 may include unigrams, bigrams, and trigrams. Part-of-speech 308 may be related to number of occurrences of each part-of speech (POS) tag in the sentence, normalized by the length of the sentence. A readability feature 309 may be related to length of the sentence in word or in characters. A subjectivity feature 310 may be related to number of passive constructions, hedge words, first person pronouns, third person pronouns, etc. Word2Vec 311 may be related to a sentence vector computed based on an average of the precomputed (via a word2vec tool) word vectors in the sentence. It can be understood that a system for formality classification and/or transformation may use one or more of the listed linguistic features in FIG. 3. It can also be understood that more linguistic features other than the ones listed in FIG. 3 may be utilized for formality classification and/or transformation.

FIG. 4 illustrates exemplary sentences before and after a formality transformation, according to an embodiment of the present teaching. As shown in FIG. 4, sentences may be transformed to different formality levels, with their literal meaning maintained. For example, "I think the heat agitates people . . . " 410 may be transformed to "I believe that the heat agitates people." 415. For example, "Oh, I know." 420 may be transformed to "Yes, I am aware." 425. These parallel sentences may be utilized for training a formality transformation model to transform online text items, e.g. emails, blog posts, social media inputs, etc.

Figure 5:
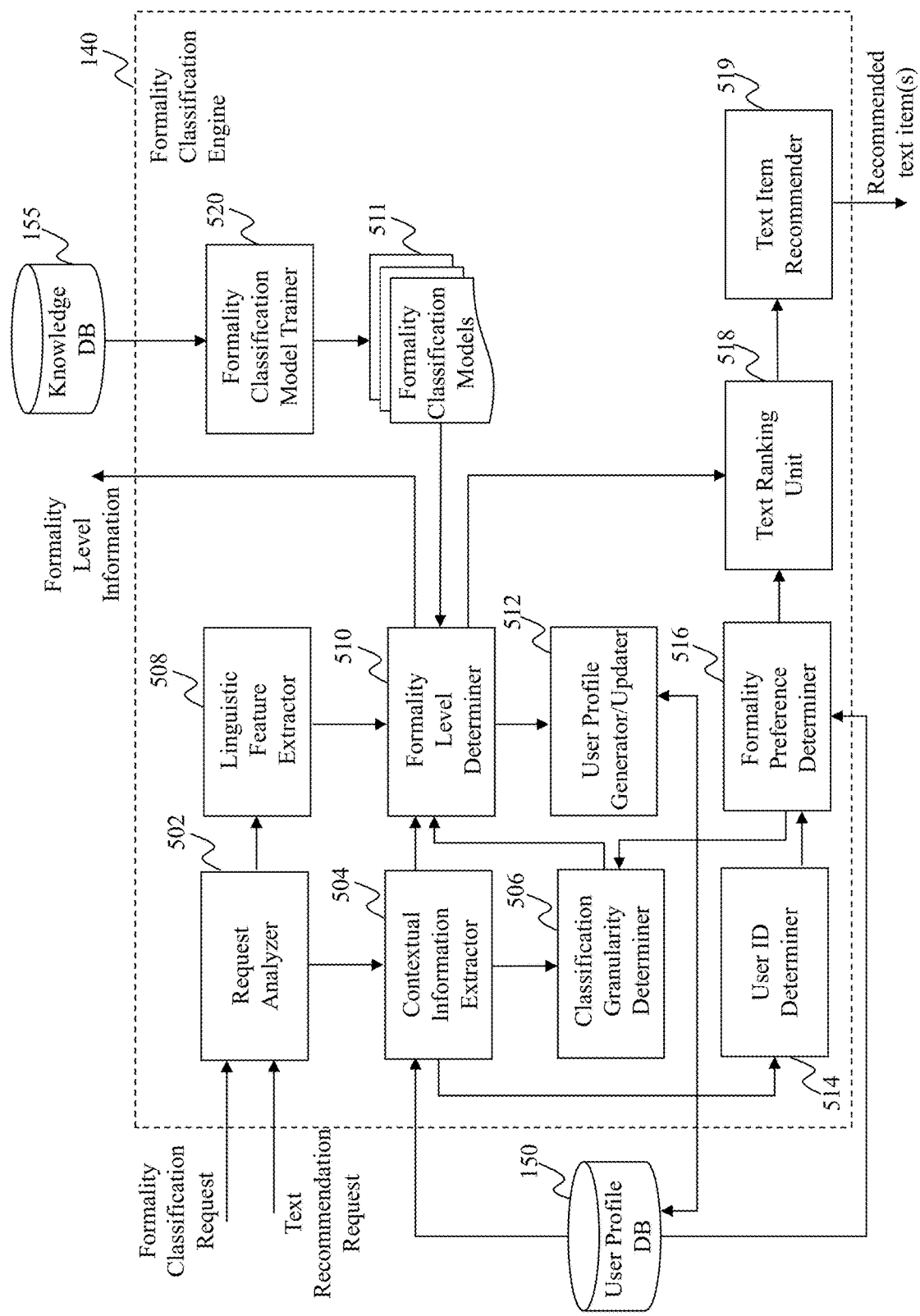
FIG. 5 illustrates an exemplary diagram of a formality classification engine, according to an embodiment of the present teaching.

FIG. 5 illustrates an exemplary diagram of a formality classification engine 140, according to an embodiment of the present teaching. The formality classification engine 140 in this example includes a request analyzer 502, a contextual information extractor 504, a classification granularity determiner 506, a linguistic feature extractor 508, a formality level determiner 510, one or more formality classification models 511, a user profile generator/updater 512, a user ID determiner 514, a formality preference determiner 516, a text ranking unit 518, a text item recommender 519, and a formality classification model trainer 520.

The request analyzer 502 in this example receives a request related to text formality, either from the service provider 130 or directly from a user of the service provider 130. In one embodiment, the request may be for determining a formality level for a text item in an online communication, e.g. an email, a blog post, or a social media writing input. In this case, the request may be received with the text item and some metadata related to the request. In another embodiment, the request may be for selecting an online text item to be recommended to an online user. In this case, the request may be received with a plurality of text items available for selection and some metadata related to the request. Both cases may be called formality determination or formality classification. The request analyzer 502 may analyze the request to determine what kind of request it is. In either case, the request analyzer 502 may send the request with text item(s) and metadata to the contextual information extractor 504 for extracting contextual information and to the linguistic feature extractor 508 for extracting linguistic features.

The contextual information extractor 504 in this example may receive the request and metadata from the request analyzer 502, and extract contextual information from the metadata. For a text item in an online communication, contextual information may comprise at least information about one of the following: sender of the online communication, receiver of the online communication, purpose of the online communication, and role of the text item in the online communication. Regarding an online user for text recommendation, contextual information may comprise personal information about the user. In this case, the contextual information extractor 504 may extract the contextual information about the online user from a user profile of the online user retrieved from the user profile database 150. The contextual information extractor 504 may send the contextual information to the classification granularity determiner 506 for determining a classification granularity level and to the formality level determiner 510 for determining a formality level of the text item(s). In one embodiment, when the formality classification engine 140 is responding to a request for selecting an online text item from a plurality of text items to be recommended to an online user, the contextual information extractor 504 may send the contextual information to the user ID determiner 514 for determining a user identity (ID) of the online user.

The classification granularity determiner 506 in this example can determine a granularity level for the text formality classification. When determining a formality level for a text item, e.g. an email, the system may determine how formal each sentence is in the email, or determine the degree of formality for each paragraph in the email, or just determine an overall degree of formality of the email. The classification granularity determiner 506 can determine a granularity level according to which the formality determination will be performed. In one embodiment, the classification granularity determiner 506 may determine the granularity level for the text item in an online communication, based on the contextual information of the online communication. For example, if the purpose of the online communication is for posting a comment online, the granularity level may be for determining formality based on the entire comment. If the purpose of the online communication is for sending a business email to a client, the granularity level may be for determining formality level based on each sentence in the email.

In another embodiment, the classification granularity determiner 506 may determine the granularity level for one or more online text items, based on a formality preference of an online user, such that an online text item may be recommended to the online user. For example, if the online user prefers a granularity level at each sentence, the granularity level may be set for determining formality level based on each sentence in each online text item. The classification granularity determiner 506 may receive information about the formality preferences of the online user from the formality preference determiner 516. In one example, the formality preference of the online user may be determined based on historical online behaviors of the online user.

The linguistic feature extractor 508 in this example may receive the request and metadata from the request analyzer 502, and extract linguistic features from each text item associated with the request. As discussed above, the linguistic features may include a casing feature, a punctuation feature, numbers and types of entities, n-grams, constituency, dependency tuples, lexical feature, word length and frequency feature, readability feature, subjectivity feature, or average word embedding. The linguistic feature extractor 508 may send the extracted linguistic features to the formality level determiner 510 for determining a formality level of each text item associated with the request.

The formality level determiner 510 in this example receives the contextual information from the contextual information extractor 504 and the linguistic features from the linguistic feature extractor 508. Based on the contextual information and/or the linguistic features of a text item, the formality level determiner 510 may determine a formality level for the text item, using one of the formality classification models 511. A formality classification model may be a machine learning model trained with textual data along with their linguistic features, contextual information, etc. Depending on the availability of linguistic features and contextual information of a text item, the formality level determiner 510 may select one of the formality classification models 511. In one embodiment, when the formality classification engine 140 is responding to a request for selecting an online text item from a plurality of text items to be recommended to an online user, the formality level determiner 510 may select one of the formality classification models 511, based on the linguistic features and contextual information of the plurality of text items.

In another embodiment, the formality level determiner 510 also receives the granularity level from the classification granularity determiner 506, and determines the formality level for the text item in accordance with the granularity level. In this case, the formality level determiner 510 may select one of the formality classification models 511 based on the granularity level.

The formality level determined by the formality level determiner 510 may be real values representing degrees of formality for a text item. In one example, the real values may be between −10 and 10, such that the larger the value is, the more formal the text item is at a given granularity level. In other examples, the real values may be in other ranges, e.g. between 0 and 1, between 0 and 100, etc. The formality level determiner 510 may provide the formality level information related to the text item, either to the service provider 130 or directly to the user, in response to the request. In one embodiment, when the formality classification engine 140 is responding to a request for determining a formality level for a text item in an online communication, the formality level determiner 510 may send the formality level information to the user profile generator/updater 512 for generating or updating a user profile of an associated user. In another embodiment, when the formality classification engine 140 is responding to a request for selecting an online text item from a plurality of text items to be recommended to an online user, the formality level determiner 510 may provide the formality level information of each of the plurality of text items to the text ranking unit 518 for ranking the plurality of text items.

The user profile generator/updater 512 in this example can generate or update a user profile of an associated user based on formality level information of a text item in an online communication associated with the user. For example, based on the formality level information of an email written by the user, the user profile generator/updater 512 may update the user profile to reflect formality level preferred or performed by the user. Based on the formality level information of an email to be sent to user A by user B, the user profile generator/updater 512 may update the user profile of user A to reflect formality level preferred by user A, upon confirmation from user B. The update may also include the linguistic features and contextual information associated with the text item. For a new user, the user profile generator/updater 512 may generate a user profile for the user. The user profile generator/updater 512 may store the generated or updated user profiles to the user profile database 150 for future use.

If the formality classification engine 140 is responding to a request for selecting an online text item from a plurality of text items to be recommended to an online user, the user ID determiner 514 in this example can receive the contextual information from the contextual information extractor 504 and determine a user ID of the online user. The user ID determiner 514 may send the user ID to the formality preference determiner 516. The formality preference determiner 516 in this example can retrieve a user profile associated with the user ID, from the user profile database 150. Based on the user profile, the formality preference determiner 516 can determine a formality preference of the online user. In one example, the formality preference of the online user may have already been stored in the user profile. In another example, the formality preference of the online user may be determined based on historical online behavior of the online user that is stored in the user profile. The formality preference of the online user may indicate a formality level preferred by the online user, a granularity level preferred by the online user, or a minimum formality level that can be accepted by the online user. The formality preference determiner 516 may send the formality preference information to the classification granularity determiner 506 for determining a granularity level and to the text ranking unit 518 for ranking the plurality of text items.

The text ranking unit 518 in this example can rank the plurality of text items based on the formality preference information of the online user received from the formality preference determiner 516 and the formality level information of each of the plurality of text items received from the formality level determiner 510. For example, the text ranking unit 518 may rank a first text item higher than a second text item if the difference between the formality level of the first text item and the formality level preferred by the online user is smaller than the difference between the formality level of the second text item and the formality level preferred by the online user. In another example, the text ranking unit 518 may rank a first text item higher than a second text item if the formality level of the first text item is higher than that of the second text item and higher than the formality level preferred by the online user. In yet another example, the text ranking unit 518 may rank a first text item higher than a second text item if the formality level of the first text item is higher than that of the second text item, regardless of the formality level preferred by the online user. The text ranking unit 518 may send the ranked text items to the text item recommender 519. The text item recommender 519 may select one or more text items from the ranked text items and provide the selected one or more text items to be recommended to the online user. For example, the text item recommender 519 may select the one or more top ranked text items. For example, among ten news articles ranked based on their formality levels and the formality level preferred by the online user, the text item recommender 519 can select the top two news articles to be recommended to the online user.

The formality classification model trainer 520 in this example may train the one or more formality classification models 511, based on training data generated from the knowledge database 155. As discussed above, the training data may include known formality levels and corresponding linguistic features, contextual information, granularity level, etc. From time to time, the formality classification model trainer 520 may generate a new formality classification model or update an existing formality classification model.

Figure 6:
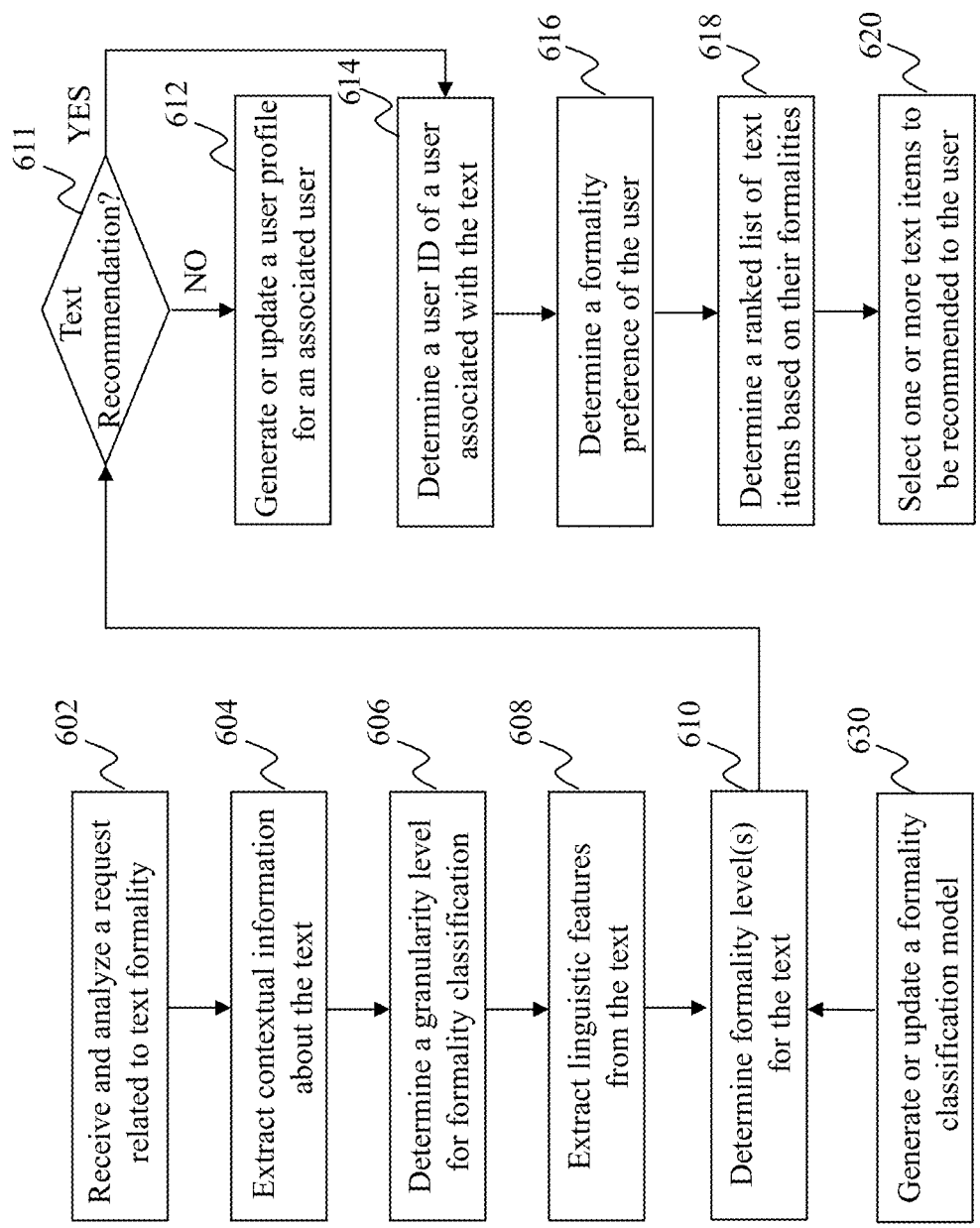
FIG. 6 shows a flowchart of an exemplary process performed by a formality classification engine, according to an embodiment of the present teaching.

FIG. 6 shows a flowchart of an exemplary process performed by a formality classification engine, e.g. the formality classification engine 140 in FIG. 5, according to an embodiment of the present teaching. A request related to text formality is received and analyzed at 602. The request may be for determining a formality level of a text item, either for an online communication or for text recommendation to an online user. At 604, contextual information about the text item is extracted. A granularity level is determined for formality classification at 606. Linguistic features are extracted from the text item at 608. Then the process moves to 610. At 630, a formality classification model is generated or updated. The process then moves to 610 as well.

A formality level is determined at 610 for the text item, e.g. based on the formality classification model. At 611, it is determined whether the request is for text recommendation to an online user. If so, the process moves to 614 to determine a user ID of the online user, and the process moves on to 616. If not, the process moves to 612, where a user profile is generated or updated for an associated user based on the formality level information.

At 616, a formality preference of the online user is determined. At 618, a ranked list of text items is determined based on their formalities. At 620, one or more text items are selected from the ranked text items to be recommended to the online user.

It can be understood that the order of the steps shown in FIG. 6 may be changed according to different embodiments of the present teaching.

Figure 7:
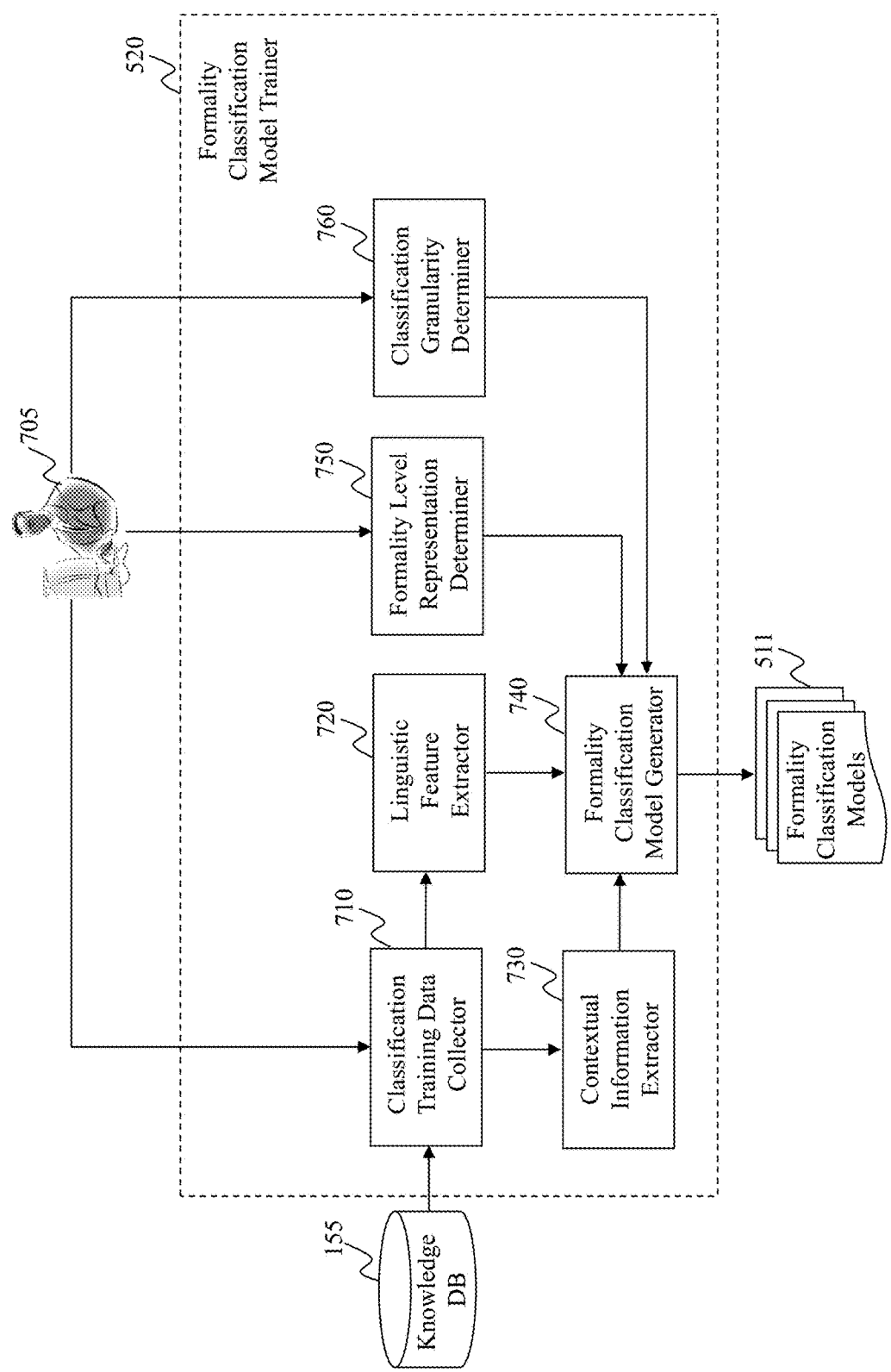
FIG. 7 illustrates an exemplary diagram of a formality classification model trainer, according to an embodiment of the present teaching.

FIG. 7 illustrates an exemplary diagram of a formality classification model trainer 520, according to an embodiment of the present teaching. As shown in FIG. 7, the formality classification model trainer 520 in this example includes a classification training data collector 710, a linguistic feature extractor 720, a contextual information extractor 730, a formality classification model generator 740, a formality level representation determiner 750, and a classification granularity determiner 760.

The classification training data collector 710 in this example may collect training data for formality classification. The training data may be a corpus of sentences coming from the knowledge database 155 or from an online platform, e.g. Yahoo Answers, wherein the sentences have been manually annotated with formality levels, e.g. by a manager 705 of the system. The manager 705 may control the source of the training data and/or the timing of the training data collection at the classification training data collector 710. The classification training data collector 710 can send the collected training data to the linguistic feature extractor 720 for linguistic feature extraction and to the contextual information extractor 730 for contextual information extraction.

The linguistic feature extractor 720 in this example may receive the training data from the classification training data collector 710, and extract linguistic features from each sentence in the training data. As discussed above, the linguistic features may include a casing feature, a punctuation feature, numbers and types of entities, n-grams, constituency, dependency tuples, lexical feature, word length and frequency feature, readability feature, subjectivity feature, or average word embedding. The linguistic feature extractor 720 may send the extracted linguistic features to the formality classification model generator 740 for generating a formality classification model. In practice, the linguistic feature extractor 720 may be a same unit as the linguistic feature extractor 508, or a different unit than the linguistic feature extractor 508.

The contextual information extractor 730 in this example may receive the training data from the classification training data collector 710, and extract contextual information from the training data. For training data from online communications, contextual information may comprise information about senders of the online communications, receivers of the online communications, purposes of the online communications, and roles of the training data in the online communications. The contextual information extractor 730 may send the contextual information to 740 for generating a formality classification model. In practice, the contextual information extractor 730 may be a same unit as the contextual information extractor 504, or a different unit than the contextual information extractor 504.

The formality classification model generator 740 in this example can generate or update a formality classification model 511 based on the training data, the extracted linguistic features and contextual information. The training at 740 may be based on a formality level representation and a classification granularity level. A formality level representation may indicate how to represent a formality level, e.g. based on a score, a real-value number, a percentage number, or a binary number. A classification granularity level may indicate a granularity degree at which to determine a formality level for a text item, e.g. determining a formality score for every word, every sentence or every paragraph in the text item. The system may also determine a formality score for an entire text item, e.g. an entire article.

The formality level representation determiner 750 in this example may determine the formality level representation for the model. This may be based on an instruction from the manager 705. The manager 705 may instruct the formality level representation determiner 750 to set up a representation type for the formality level, e.g. a score, a real-value number, a percentage number, or a binary number. The manager 705 may also instruct the formality level representation determiner 750 to set up a representation range for the formality level, e.g. between 0 and 100, or between −1 and +1. The formality level representation determiner 750 may send the formality level representation information to the formality classification model generator 740.

The classification granularity determiner 760 in this example can determine a granularity level for the text formality classification. This may also be based on an instruction from the manager 705. When training the formality classification model with a text item, e.g. an email, the manager 705 may instruct the classification granularity determiner 760 to select a granularity for each sentence in the email, each paragraph in the email, or just the entire email, for formality classification. In one embodiment, the classification granularity determiner 760 may determine to try every possible granularity level, such that different formality classification models may be trained in accordance with different classification granularity levels. The classification granularity determiner 760 may send the granularity level information to the formality classification model generator 740. In practice, the classification granularity determiner 760 may be a same unit as the classification granularity determiner 506, or a different unit than the classification granularity determiner 506.

The formality classification model generator 740 may train the formality classification models 511, each of which is a machine learning model based on ridge regression, with model parameters tuned using cross validation on the training data.

Figure 8:
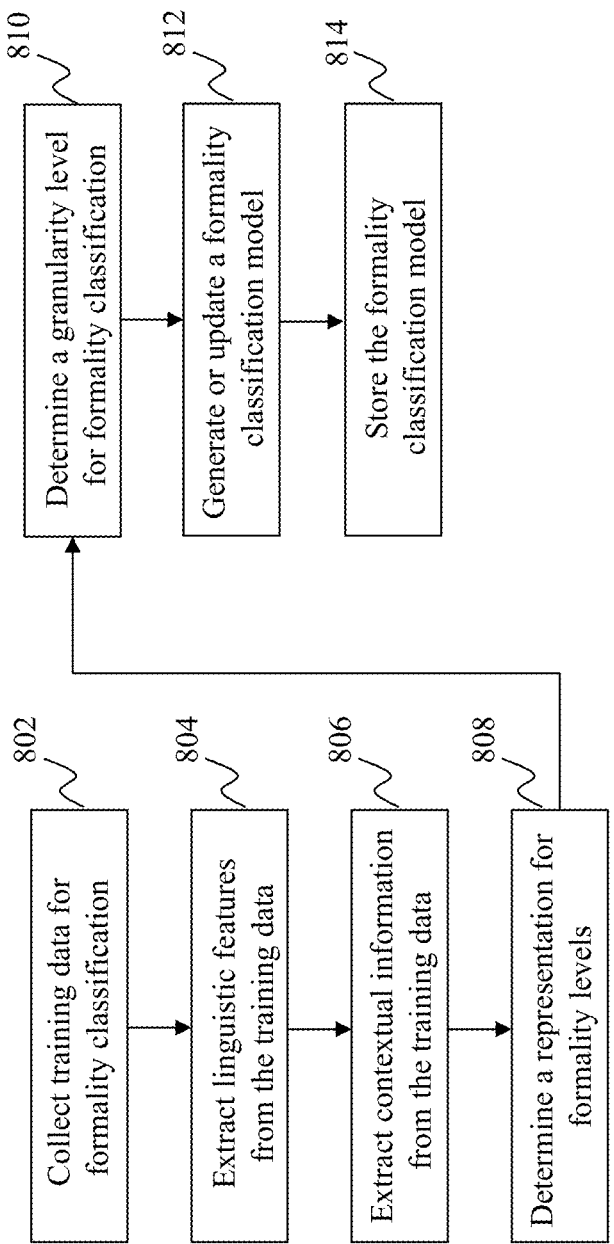
FIG. 8 shows a flowchart of an exemplary process performed by a formality classification model trainer, according to an embodiment of the present teaching.

FIG. 8 shows a flowchart of an exemplary process performed by a formality classification model trainer, e.g. the formality classification model trainer 520 in FIG. 7, according to an embodiment of the present teaching. Training data are collected for formality classification at 802. At 804, linguistic features are extracted from the training data. At 806, contextual information is extracted from the training data. A representation for formality levels is determined at 808.

A granularity level is determined for formality classification at 810. At 812, a formality classification model is generated or updated. At 814, the formality classification model is stored.

It can be understood that the order of the steps shown in FIG. 8 may be changed according to different embodiments of the present teaching.

Figure 9:
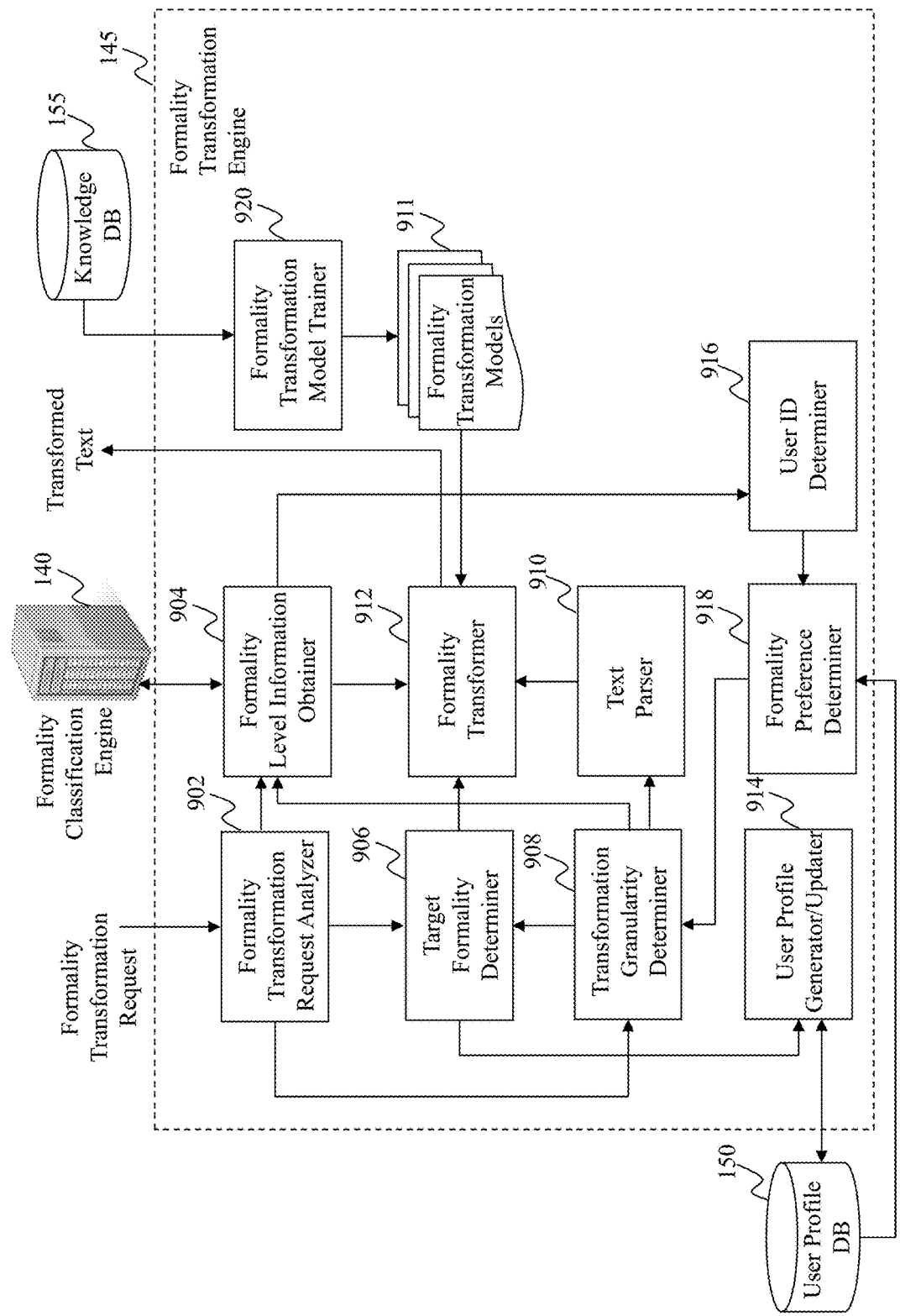
FIG. 9 illustrates an exemplary diagram of a formality transformation engine, according to an embodiment of the present teaching.

FIG. 9 illustrates an exemplary diagram of a formality transformation engine 145, according to an embodiment of the present teaching. As shown in FIG. 9, the formality transformation engine 145 in this example includes a formality transformation request analyzer 902, a formality level information obtainer 904, a target formality determiner 906, a transformation granularity determiner 908, a text parser 910, one or more formality transformation models 911, a formality transformer 912, a user profile generator/updater 914, a user ID determiner 916, a formality preference determiner 918, and a formality transformation model trainer 920.

The formality transformation request analyzer 902 in this example receives a request for text formality transformation, either from the service provider 130 or directly from a user of the service provider 130. In one embodiment, the request may be for transforming a formality level of a text item in an online communication, e.g. an email, a blog post, or a social media writing input, from a first level to a second level. In another embodiment, the request may be for transforming a formality level of a text item to be recommended to an online user. The formality transformation request analyzer 902 may analyze the request to determine what kind of request it is. In either case, the formality transformation request analyzer 902 may receive the formality transformation request along with the text item and some metadata related to the request. The formality transformation request analyzer 902 may send the request with text item and the metadata to the formality level information obtainer 904 for obtaining formality level information about the text item, to the target formality determiner 906 for determining a target formality level for the formality transformation, and to the transformation granularity determiner 908 for determining a transformation granularity level.

The formality level information obtainer 904 in this example may obtain a current formality level for the text item. In one embodiment, the formality level information obtainer 904 may communicate with the formality classification engine 140 to obtain the formality level information about the text item. For example, the formality level information obtainer 904 may send a formality classification request to the formality classification engine 140 for determining a current formality level for the text item, such that after the formality classification engine 140 performs the formality classification, the formality classification engine 140 can send back the formality level information of the text item to the formality level information obtainer 904. The formality level information may include the current formality level for the text item, as well as contextual information and linguistic features about the text item. In one embodiment, the formality level information obtainer 904 may receive a transformation granularity level from the transformation granularity determiner 908, such that the formality level information obtainer 904 can send the formality classification request with the transformation granularity level to the formality classification engine 140. As such, the formality classification engine 140 can return the current formality level for the text item in accordance with the transformation granularity level. For example, if the transformation granularity level indicates a per sentence formality transformation, after receiving the formality classification request, the formality classification engine 140 can generate formality level including formality scores for each sentence in the text item and send these formality scores to the formality level information obtainer 904. The formality level information obtainer 904 may send the formality level information to the formality transformer 912 for formality transformation. In one embodiment, when the formality transformation engine 145 is transforming a formality level of a text item to be recommended to an online user, the formality level information obtainer 904 may send the formality level information to the user ID determiner 916 for determining a user ID of the online user.

The target formality determiner 906 in this example may determine a target formality level for the formality transformation, such that the text item will be transformed to have a formality level equal to the target formality level. When the formality transformation engine 145 is transforming a formality level of a text item in an online communication, the target formality determiner 906 may determine the target formality level based on the formality transformation request which may include a specified target formality level for the formality transformation. When the formality transformation engine 145 is transforming a formality level of a text item to be recommended to an online user, the target formality determiner 906 may determine the target formality level based on a formality preference of the online user that is determined by the formality preference determiner 918 and forwarded to the target formality determiner 906 by the transformation granularity determiner 908. The target formality level and the current formality level for the text item may have a same granularity level. As such, the target formality level determined by the target formality determiner 906 may also be based on the transformation granularity level determined by the transformation granularity determiner 908. The target formality determiner 906 may send the target formality level to the formality transformer 912 for formality transformation. In one embodiment, when the formality transformation engine 145 is transforming a formality level of a text item in an online communication, the target formality determiner 906 may send the target formality level to the user profile generator/updater 914 for generating or updating a user profile of an associated user. For example, if a user requests to transform a text item from formality level A to formality level B, the user profile generator/updater 914 may update a user profile of the user to indicate that formality level B is one of the formality levels preferred by the user.

The transformation granularity determiner 908 in this example can determine a granularity level for the text formality transformation. When transforming a formality level of a text item in an online communication, e.g. an email, the transformation granularity determiner 908 may determine the text item to be transformed for each sentence in the email, i.e. each sentence is transformed to meet a target formality level, or transformed for each paragraph in the email, or transformed as an entire email. In one embodiment, the transformation granularity determiner 908 may determine the granularity level for the text formality transformation based on the formality transformation request which may include a specified granularity level. In another embodiment, the transformation granularity determiner 908 may determine the granularity level for the text formality transformation based on some contextual information of the online communication. For example, if the purpose of the online communication is for posting a comment online, the transformation granularity level may be for transforming at the entire comment level. If the purpose of the online communication is for sending a business email to a client, the transformation granularity level may be for transforming each sentence in the email.

In another embodiment, when the formality transformation engine 145 is transforming a formality level of a text item to be recommended to an online user, the transformation granularity determiner 908 may determine the transformation granularity level based on a formality preference of the online user. For example, if the online user prefers a granularity level at each sentence, the granularity level may be set for transforming each sentence in the text item to meet the target formality level. The transformation granularity determiner 908 may receive information about the formality preferences of the online user from the formality preference determiner 918. In one example, the formality preference of the online user may be determined based on historical online behaviors of the online user, e.g. the online user's previous formality transformation requests. The transformation granularity determiner 908 may send the transformation granularity level to the text parser 910 for parsing the text item, to the target formality determiner 906 for determining a target formality level, and to the formality transformer 912 for transforming formality level of the text item.

The text parser 910 in this example may receive the transformation granularity level from the target formality determiner 906, and parse the text item in accordance with the transformation granularity level. For example, when the transformation granularity level indicates to transform each sentence of the text item to meet a target formality level, the text parser 910 may parse the text item into sentences and send the sentences to the formality transformer 912 for formality transformation.

The formality transformer 912 in this example receives the parsed text item from the text parser 910, receives the current formality level of the text item from the formality level information obtainer 904, and receives a target formality level for the text item from the target formality determiner 906. The target formality determiner 906 may select one of the formality transformation models 911 for transforming the text item. The transformation may be focusing on formality transformation, without changing the literal meaning of the text item, e.g. like the transformation shown in FIG. 4. Both the current formality level and the target formality level for the text item include transformation granularity information, and they should have the same transformation granularity level. The target formality determiner 906 may thus select one of the formality transformation models 911 based on the transformation granularity level. A formality transformation model may be a machine learning model trained with parallel textual data. The parallel textual data may include different versions of training sentences such that the different versions of a same training sentence have a same literal meaning but different known formality levels, like the parallel sentences shown in FIG. 4. The formality transformer 912 may use the selected formality transformation model to transform the text item from the current formality level to the target formality level, in accordance with the transformation granularity level. The formality transformer 912 may then provide the transformed text item to the service provider 130 or directly to the user, as a response to the formality transformation request.

In one embodiment, a formality transformation model is trained with parallel textual data along with their linguistic features, contextual information, etc. In this case, the formality transformer 912 may also receive the linguistic features and contextual information of the text item from the formality level information obtainer 904 which may obtain these data from the formality classification engine 140. The formality transformer 912 may then utilize the formality transformation model to transform the text item based on the linguistic features and contextual information of the text item.

Both the current formality level and the target formality level may be real values representing degrees of formality for the text item. In one example, the real values may be between −10 and 10, such that the larger the value is, the more formal the text item is at a given granularity level. In other examples, the real values may be in other ranges, e.g. between 0 and 1, between 0 and 100, etc.

The user profile generator/updater 914 in this example can generate or update a user profile of an associated user based on the formality transformation request. For example, based on the target formality level for formality transformation, the user profile generator/updater 914 may update the user profile to reflect the target formality level as a formality level preferred by the user. The update may also include the linguistic features and contextual information associated with the text item. For a new user, the user profile generator/updater 914 may generate a user profile for the user. The user profile generator/updater 914 may store the generated or updated user profiles to the user profile database 150 for future use. In practice, the user profile generator/updater 914 may be a same unit as the user profile generator/updater 512, or a different unit than the user profile generator/updater 512.

When the formality transformation engine 145 is transforming a formality level of a text item to be recommended to an online user, the user ID determiner 916 in this example can receive the contextual information from the formality level information obtainer 904 and determine a user ID of the online user. The user ID determiner 916 may send the user ID to the formality preference determiner 918. The formality preference determiner 918 in this example can retrieve a user profile associated with the user ID, from the user profile database 150. Based on the user profile, the formality preference determiner 918 can determine a formality preference of the online user. In one example, the formality preference of the online user may have already been stored in the user profile. In another example, the formality preference of the online user may be determined based on historical online behavior of the online user that is stored in the user profile. The formality preference of the online user may indicate a formality level preferred by the online user, a granularity level preferred by the online user, or a minimum formality level that can be accepted by the online user. The formality preference determiner 918 may send the formality preference information to the transformation granularity determiner 908 for determining a transformation granularity level and to the target formality determiner 906 (via the transformation granularity determiner 908) for determining a target formality level for the text formality transformation. In this case, the formality transformer 912 may transform a formality level of a text item to a target formality level that is preferred by or can be accepted by the online user, such that the transformed text item can be recommended to the online user. For example, after the service provider 130 determines to recommend a news article to an online user based on literal meaning of the news article, the formality transformation engine 145 disclosed herein may help to transform the news article to a formality that is preferred by the online user without changing the literal meaning of the news, which can further improve user experience of the online user. In practice, the user ID determiner 916 may be a same unit as the user ID determiner 514, or a different unit than the user ID determiner 514. In practice, the formality preference determiner 918 may be a same unit as the formality preference determiner 516, or a different unit than the formality preference determiner 516.

The formality transformation model trainer 920 in this example may train the one or more formality transformation models 911, based on training data generated from the knowledge database 155. As discussed above, the training data may include parallel sentences with known formality levels and corresponding linguistic features, contextual information, granularity level, etc. From time to time, the formality transformation model trainer 920 may generate a new formality transformation model or update an existing formality transformation model.

Figure 10:
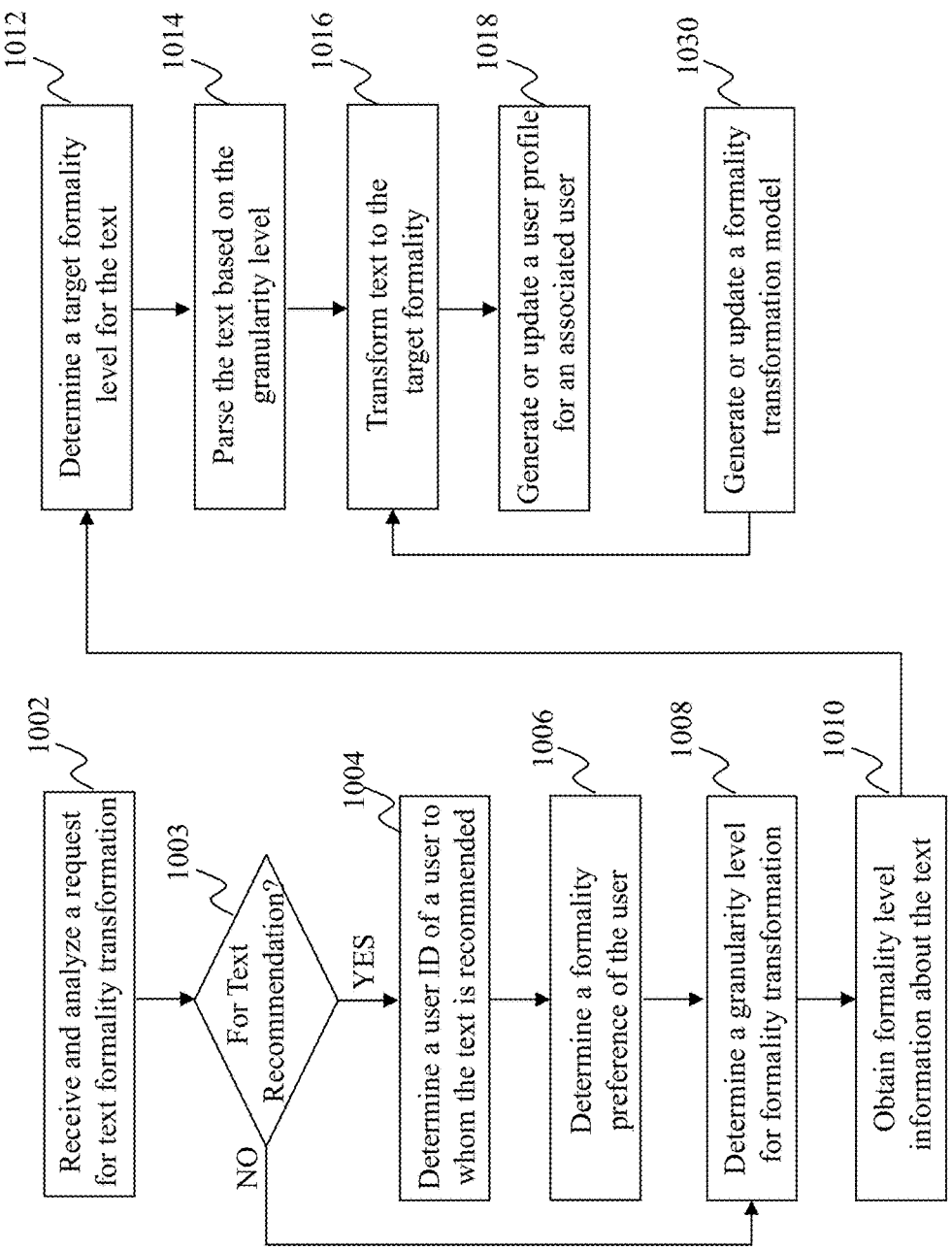
FIG. 10 shows a flowchart of an exemplary process performed by a formality transformation engine, according to an embodiment of the present teaching.

FIG. 10 shows a flowchart of an exemplary process performed by a formality transformation engine, e.g. the formality transformation engine 145 in FIG. 9, according to an embodiment of the present teaching. A request is received and analyzed at 1002 for text formality transformation. At 1003, it is determined whether the request is for text recommendation to an online user. If so, the process goes to 1004. If not, the process moves directly to 1008.

At 1004, a user ID of the online user is determined. A formality classification of the online user is determined at 1006, e.g. based on the user ID and a user profile of the online user. At 1008, a granularity level is determined for the formality transformation. Formality level information about the text item may be obtained at 1010. The formality level information may include a current formality level of the text item, as well as linguistic features and/or contextual information about the text item.

At 1012, a target formality level is determined for the text formality transformation. The text item is parsed at 1014 based on the granularity level. The process then moves on to 1016. At 1030, a formality transformation model is generated or updated; and the process moves to 1016 as well. At 1016, the text item is transformed to the target formality level, e.g. based on the formality transformation model. A user profile for an associated user may be generated or updated at 1018, based on the formality transformation request.

It can be understood that the order of the steps shown in FIG. 10 may be changed according to different embodiments of the present teaching.

Figure 11:
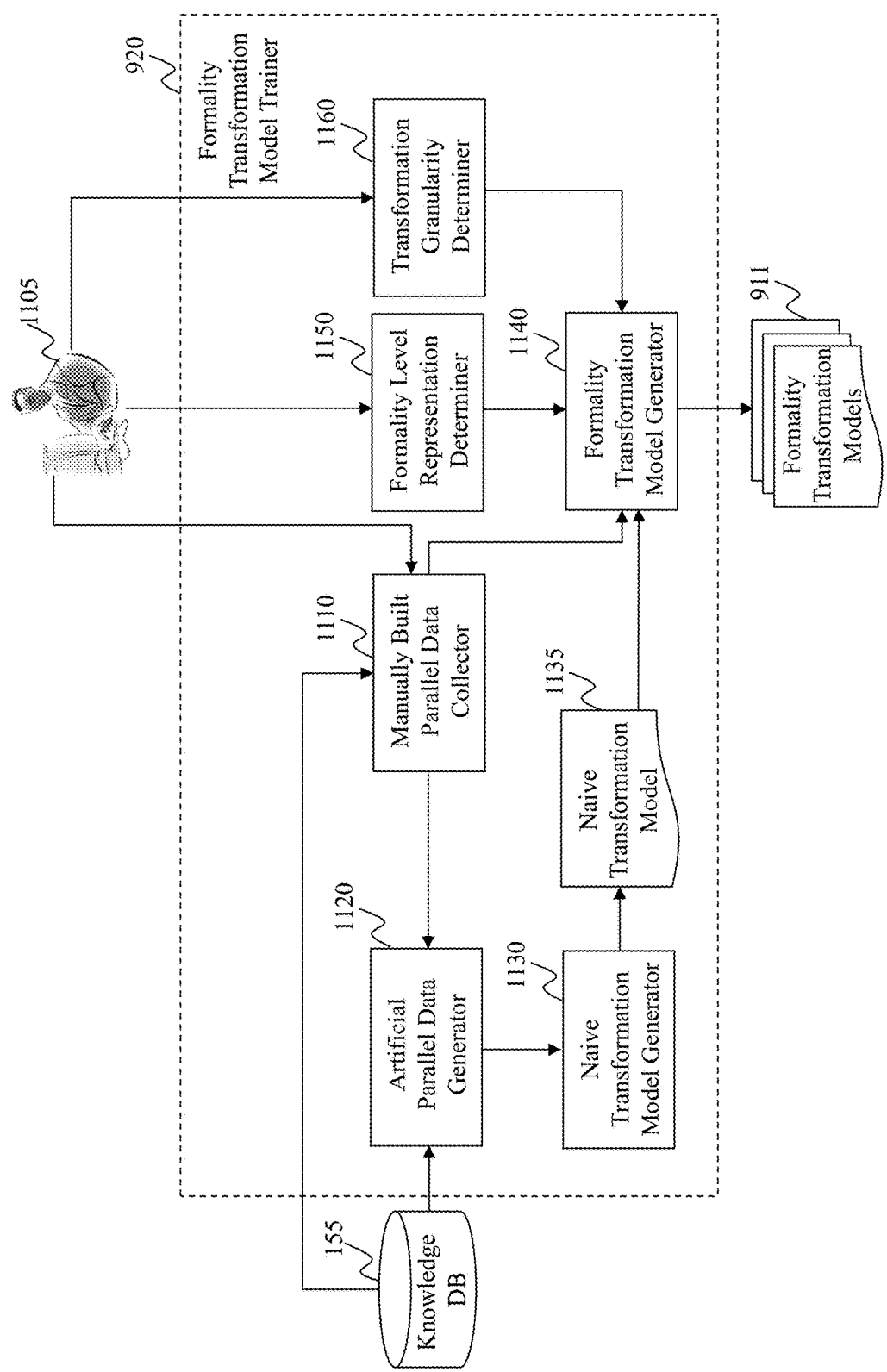
FIG. 11 illustrates an exemplary diagram of a formality transformation model trainer, according to an embodiment of the present teaching.

FIG. 11 illustrates an exemplary diagram of a formality transformation model trainer 920, according to an embodiment of the present teaching. As shown in FIG. 11, the formality transformation model trainer 920 in this example includes a manually built parallel data collector 1110, an artificial parallel data generator 1120, a naïve transformation model generator 1130, a naïve transformation model 1135, a formality transformation model generator 1140, a formality level representation determiner 1150, and a transformation granularity determiner 1160.

The manually built parallel data collector 1110 in this example may a corpus of manually built training data for formality transformation. The manually built training data may come from some crowdsourcing, e.g. a corpus of sentences coming from the knowledge database 155 or from an online platform, e.g. Yahoo Answers, wherein each sentence has different versions and each version has a different but known formality level, e.g. annotated by a manager 1105 of the system. The manager 1105 may control the source of the training data and/or the timing of the training data collection at the manually built parallel data collector 1110. The manually built parallel data collector 1110 can send the collected training data to the artificial parallel data generator 1120 for generating more sophisticated training data and to the formality transformation model generator 1140 for generating the formality transformation model. In practice, the manager 1105 may be a same person as the manager 705, or a different person than the manager 705.

The artificial parallel data generator 1120 in this example may receive the manually built training data from the manually built parallel data collector 1110, extract a phrase table from the manually built training data, and generate a large corpus of artificially generated training data, e.g. based on a greedy paraphrase algorithm. The artificially generated training data generated by the artificial parallel data generator 1120 may be a larger corpus than the manually built training data collected by the manually built parallel data collector 1110. The artificial parallel data generator 1120 can send the artificially generated training data to the naïve transformation model generator 1130 for generating a naïve transformation model.

The naïve transformation model generator 1130 in this example may receive the artificially generated training data from the artificial parallel data generator 1120, and train on the large corpus of artificially generated training data to produce a naïve transformation model 1135.

The formality transformation model generator 1140 may then fine-tune the naïve transformation model 1135 based on the smaller, manually built training corpus collected by the manually built parallel data collector 1110 to produce the final formality transformation model. The formality transformation model generator 1140 in this example can generate or update a formality transformation model 911 based on the training data. In one embodiment, the artificially generated training data and/or the manually built training data include the linguistic features and contextual information extracted from the training sentences.

The training at 1140 may be based on a formality level representation and a transformation granularity level. A formality level representation may indicate how to represent a formality level, e.g. based on a score, a real-value number, a percentage number, or a binary number. A transformation granularity level may indicate a granularity degree at which to transform a formality level of a text item, e.g. transforming a formality for every word, every sentence or every paragraph in the text item, just for the entire text item.

The formality level representation determiner 1150 in this example may determine the formality level representation for the model. This may be based on an instruction from the manager 1105. The manager 1105 may instruct the formality level representation determiner 1150 to set up a representation type for the formality level, e.g. a score, a real-value number, a percentage number, or a binary number. The manager 1105 may also instruct the formality level representation determiner 1150 to set up a representation range for the formality level, e.g. between 0 and 100, or between −1 and +1. The formality level representation determiner 1150 may send the formality level representation information to the formality transformation model generator 1140. In practice, the formality level representation determiner 1150 may be a same unit as the formality level representation determiner 750, or a different unit than the formality level representation determiner 750.

The transformation granularity determiner 1160 in this example can determine a granularity level for the text formality transformation. This may also be based on an instruction from the manager 1105. When training the formality transformation model with a training text item, e.g. an email, the manager 1105 may instruct the transformation granularity determiner 1160 to select a granularity for each sentence in the email, each paragraph in the email, or just the entire email, for formality transformation. In one embodiment, the transformation granularity determiner 1160 may determine to try every possible granularity level, such that different formality transformation models may be trained in accordance with different transformation granularity levels. The transformation granularity determiner 1160 may send the granularity level information to the formality transformation model generator 1140. In practice, the transformation granularity determiner 1160 may be a same unit as the transformation granularity determiner 908, or a different unit than the transformation granularity determiner 908.

In one embodiment, the formality transformation model trainer 920 may use a curriculum-learning pipeline to train on easy data in order to learn simple lexical paraphrases and normalizations. The training data may be generated for this phase automatically, using a greedy paraphrasing algorithm and a small phrase table extracted from a parallel corpus. The formality transformation model trainer 920 then continues training the pre-trained model in order to learn larger scale changes such as structural changes and syntactic re-ordering. The training data in this phase is manually-built parallel corpus.

Figure 12:
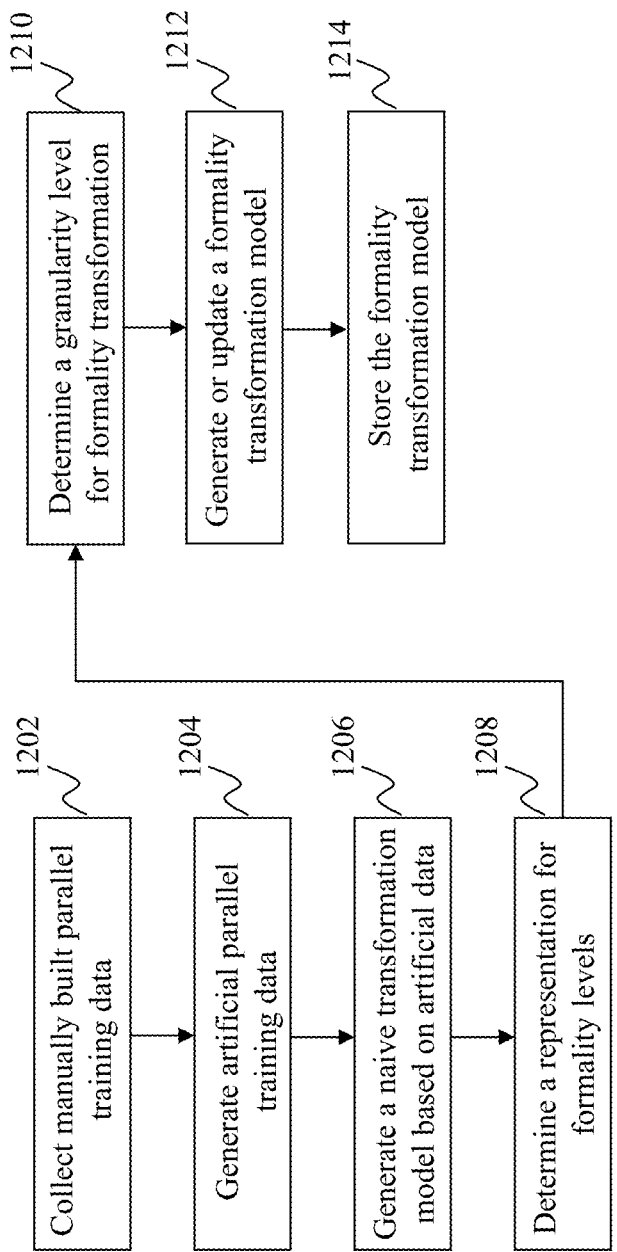
FIG. 12 shows a flowchart of an exemplary process performed by a formality transformation model trainer, according to an embodiment of the present teaching.

FIG. 12 shows a flowchart of an exemplary process performed by a formality transformation model trainer, e.g. the formality transformation model trainer 920 in FIG. 11, according to an embodiment of the present teaching. Manually built parallel training data are collected at 1202. At 1204, artificial parallel training data are generated. A naïve transformation model is generated at 1206, based on the artificial parallel training data. At 1208, representation information for formality levels is determined.

At 1210, a granularity level is determined for the text formality transformation. At 1212, a formality transformation model is generated or updated, e.g. based on the naïve transformation model and the manually built parallel training data. The formality transformation model is stored at 1214.

It can be understood that the order of the steps shown in FIG. 12 may be changed according to different embodiments of the present teaching.

Figure 13:
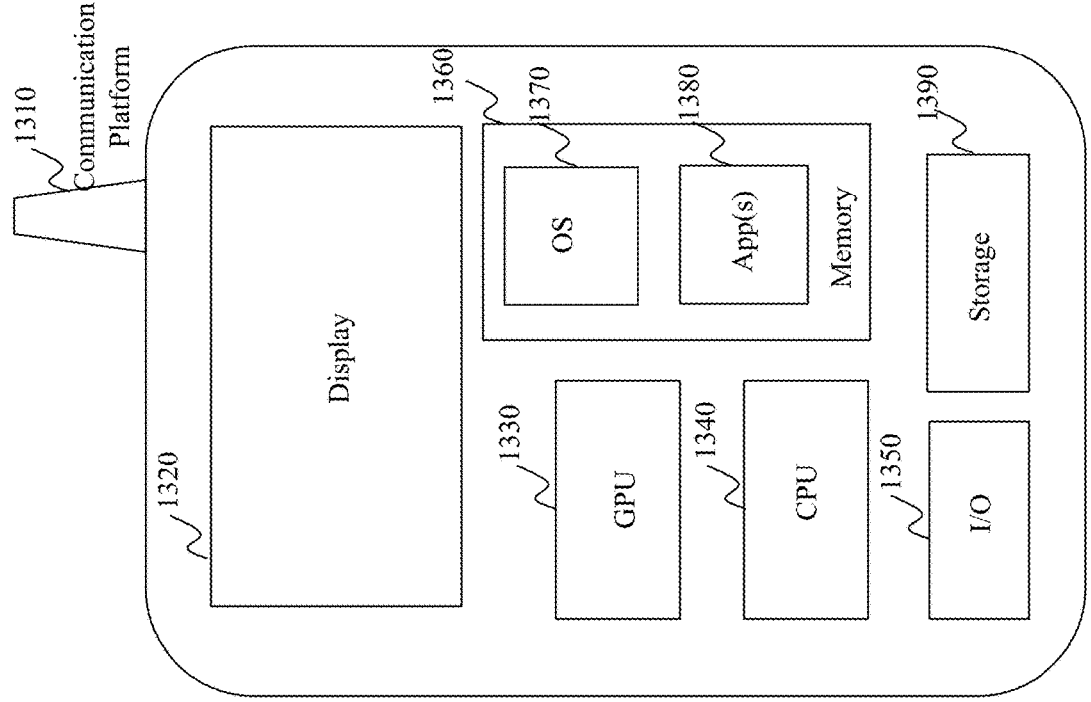
FIG. 13 depicts the architecture of a mobile device which can be used to implement a specialized system incorporating the present teaching.

FIG. 13 depicts the architecture of a mobile device which can be used to realize a specialized system implementing the present teaching. In this example, the user device on which an online text item is presented and interacted-with is a mobile device 1300, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1300 in this example includes one or more central processing units (CPUs) 1340, one or more graphic processing units (GPUs) 1330, a display 1320, a memory 1360, a communication platform 1310, such as a wireless communication module, storage 1390, and one or more input/output (I/O) devices 1350. Any other suitable component, including but not limited to a system bus or a controller (not shown), may also be included in the mobile device 1300. As shown in FIG. 13, a mobile operating system 1370, e.g., iOS, Android, Windows Phone, etc., and one or more applications 1380 may be loaded into the memory 1360 from the storage 1390 in order to be executed by the CPU 1340. The applications 1380 may include a browser or any other suitable mobile apps for receiving text items on the mobile device 1300. User interactions with the online text items may be achieved via the I/O devices 1350 and provided to the formality classification engine 140, the formality transformation engine 145, and/or other components of systems 100 and 200, e.g., via the network 120.

To implement various modules, units, and their functionalities described in the present disclosure, computer hardware platforms may be used as the hardware platform(s) for one or more of the elements described herein (e.g., the formality classification engine 140, the formality transformation engine 145, the service provider 130 and/or other components of systems 100 and 200 described with respect to FIGS. 1-12). The hardware elements, operating systems and programming languages of such computers are conventional in nature, and it is presumed that those skilled in the art are adequately familiar therewith to adapt those technologies about automatic formality classification and transformation as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 14:
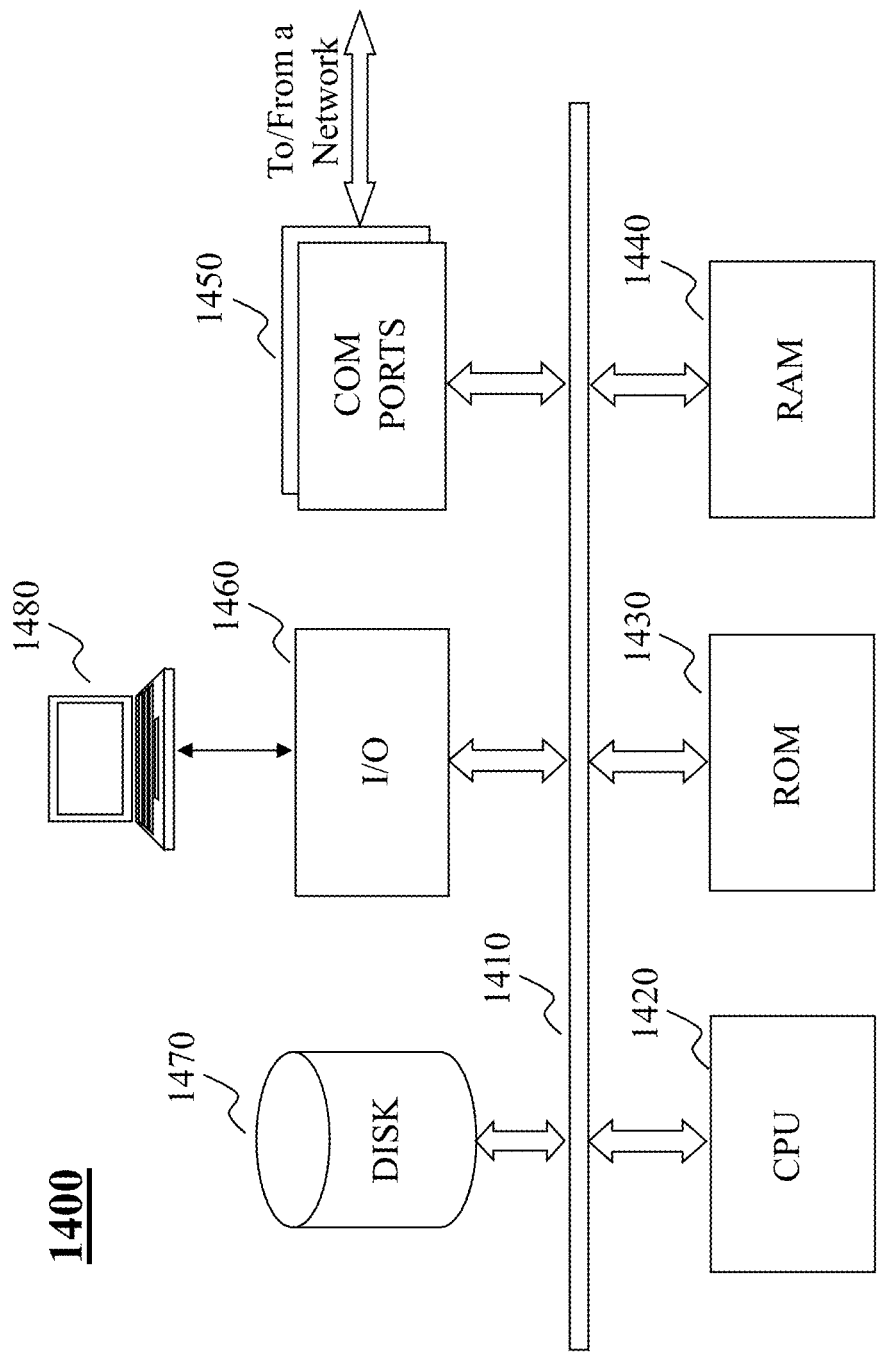
FIG. 14 depicts the architecture of a computer which can be used to implement a specialized system incorporating the present teaching.

FIG. 14 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1400 may be used to implement any component of the techniques of automatic formality classification and transformation, as described herein. For example, the service provider 130, the formality classification engine 140, the formality transformation engine 145, etc., may be implemented on a computer such as computer 1400, via its hardware, software program, firmware, or a combination thereof. Although only one such computer is shown, for convenience, the computer functions relating to automatic formality classification and transformation as described herein may be implemented in a distributed fashion on a number of similar platforms, to distribute the processing load.

The computer 1400, for example, includes COM ports 1450 connected to and from a network connected thereto to facilitate data communications. The computer 1400 also includes a central processing unit (CPU) 1420, in the form of one or more processors, for executing program instructions. The exemplary computer platform includes an internal communication bus 1410, program storage and data storage of different forms, e.g., disk 1470, read only memory (ROM) 1430, or random access memory (RAM) 1440, for various data files to be processed and/or communicated by the computer, as well as possibly program instructions to be executed by the CPU. The computer 1400 also includes an I/O component 1460, supporting input/output flows between the computer and other components therein such as user interface elements 1480. The computer 1400 may also receive programming and data via network communications.

Hence, aspects of the methods of automatic formality classification and transformation, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with automatic formality classification and transformation. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FORMALITY LEVELASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, automatic formality classification and transformation as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for recommending a text item to an online user, the method comprising:
    machine-training a plurality of models based on parallel textual data including different versions of training sentences each having a same literal meaning but different formality levels;
    receiving a request for recommending one or more text items of a plurality of text items to an online user;
    extracting one or more linguistic features from each of the plurality of text items;
    extracting contextual information with respect to the online user;

determining, using a first model of the plurality of models, a formality level of each of the plurality of text items based on the one or more linguistic features and the contextual information, wherein the formality level represents a degree of formality of the text item;

determining an identity of the online user based on the contextual information;

determining the formality preference of the online user based on a user profile associated with the identity;

ranking the plurality of text items based on their respective formality levels and the formality preference of the online user indicative of a degree of formality preferred by the online user;

selecting the one or more text items from the plurality of text items based on the ranking;

recommending the one or more text items to the online user; and updating at least one of the plurality of models based on the one or more linguistic features and the contextual information.

2. The method of claim 1, wherein the formality preference of the online user is determined based on historical online behaviors of the online user.

3. The method of claim 1, further comprising:
determining a granularity level with respect to each of the plurality of text items based on the formality preference of the online user, wherein the formality level of each of the plurality of text items is determined in accordance with the granularity level.

4. The method of claim 3, wherein:
the granularity level of each of the plurality of text items is further determined based on a purpose of an online communication with which the one or more text items are to be included;
a first granularity level is used for determining the formality level in response to the purpose of the online communication being a first purpose; and
a second granularity level is used for determining the formality level in response to the purpose of the online communication being a second purpose.

5. The method of claim 1, wherein the formality level is determined based on the first model trained with linguistic features of the parallel textual data in online communications and purposes associated with the online communications.

6. The method of claim 1, wherein the formality level is further determined based on (i) a purpose of an online communication the one or more text items are to be included within, and (ii) a granularity level of each of the plurality of text items, wherein the granularity level represents a scale from at least one word to at least one paragraph at which the formality level of the text item is to be determined.

7. The method of claim 6, wherein the purpose of the online communication is determined based on the contextual information.

8. The method of claim 1, further comprising:
modifying the user profile associated with the online user based on the formality level.

9. The method of claim 1, further comprising:
receiving training data comprising a plurality of online communications;
extracting linguistic features of textual data in the plurality of online communications from the training data;
extracting contextual information from the training data, wherein the contextual information from the training data comprises purposes associated with the plurality of online communications, and the purposes comprise at least a first purpose and a second purpose; and employing the training data, the linguistic features extracted from the training data, and the purposes indicated by the contextual information extracted from the training data to generate or update a formality classification model used to determine the formality level of the plurality of text items.

10. A non-transitory computer-readable medium storing computer program instructions that, when executed by one or more processors, effectuate operations comprising:
machine-training a plurality of models based on parallel textual data including different versions of training sentences each having a same literal meaning but different formality levels;
receiving a request for recommending one or more text items of a plurality of text items to an online user;
extracting one or more linguistic features from each of the plurality of text items;
extracting contextual information with respect to the online user;
determining, using a first model of the plurality of models, a formality level of each of the plurality of text items based on the one or more linguistic features and the contextual information, wherein the formality level represents a degree of formality of the text item;
determining an identity of the online user based on the contextual information;
determining the formality preference of the online user based on a user profile associated with the identity;
ranking the plurality of text items based on their respective formality levels and the formality preference of the online user indicative of a degree of formality preferred by the online user;
selecting the one or more text items from the plurality of text items based on the ranking;
recommending the one or more text items to the online user; and
updating at least one of the plurality of models based on the one or more linguistic features and the contextual information.

11. The non-transitory computer-readable medium of claim 10, wherein the formality preference of the online user is determined based on historical online behaviors of the online user.

12. The non-transitory computer-readable medium of claim 10, wherein the operations further comprise:
determining a granularity level with respect to each of the plurality of text items based on the formality preference of the online user, wherein the formality level of each of the plurality of text items is determined in accordance with the granularity level.

13. The non-transitory computer-readable medium of claim 12, wherein:
the granularity level of each of the plurality of text items is further determined based on a purpose of an online communication with which the one or more text items are to be included;
a first granularity level is used for determining the formality level in response to the purpose of the online communication being a first purpose; and
a second granularity level is used for determining the formality level in response to the purpose of the online communication being a second purpose.

14. The non-transitory computer-readable medium of claim 10, wherein the formality level is determined based on the first model trained with linguistic features of the parallel textual data in online communications and purposes associated with the online communications.

15. The non-transitory computer-readable medium of claim 10, wherein:
   the formality level is further determined based on (i) a purpose of an online communication the one or more text items are to be included within, and (ii) a granularity level of each of the plurality of text items;
   the granularity level represents a scale from at least one word to at least one paragraph at which the formality level of the text item is to be determined; and
   the purpose of the online communication is determined based on the contextual information.

16. The non-transitory computer-readable medium of claim 10, wherein the operations further comprise:
   modifying the user profile associated with the online user based on the formality level.

17. The non-transitory computer-readable medium of claim 10, wherein the operations further comprise:
   receiving training data comprising a plurality of online communications;
   extracting linguistic features of textual data in the plurality of online communications from the training data;
   extracting contextual information from the training data, wherein the contextual information from the training data comprises purposes associated with the plurality of online communications, and the purposes comprise at least a first purpose and a second purpose; and
   employing the training data, the linguistic features extracted from the training data, and the purposes indicated by the contextual information extracted from the training data to generate or update a formality classification model used to determine the formality level of the plurality of text items.

18. A system for recommending a text item to an online user, comprising:
   memory storing computer program instructions; and
   one or more processors that, in response to executing the computer program instructions, effectuate operations comprising:
      machine-training a plurality of models based on parallel textual data including different versions of training sentences each having a same literal meaning but different formality levels;
      receiving a request for recommending one or more text items of a plurality of text items to an online user;
      extracting one or more linguistic features from each of the plurality of text items;
      extracting contextual information with respect to the online user;
      determining, using a first model of the plurality of models, a formality level of each of the plurality of text items based on the one or more linguistic features and the contextual information, wherein the formality level represents a degree of formality of the text item;
      determining an identity of the online user based on the contextual information;
      determining the formality preference of the online user based on a user profile associated with the identity;
      ranking the plurality of text items based on their respective formality levels and the formality preference of the online user indicative of a degree of formality preferred by the online user;
      selecting the one or more text items from the plurality of text items based on the ranking;
      recommending the one or more text items to the online user; and
      updating at least one of the plurality of models based on the one or more linguistic features and the contextual information.

* * * * *